United States Patent
Ito

(10) Patent No.: US 9,762,764 B2
(45) Date of Patent: Sep. 12, 2017

(54) IMAGE FORMING SYSTEM

(71) Applicant: BROTHER KOGYO KABUSHIKI KAISHA, Nagoya-shi, Aichi-ken (JP)

(72) Inventor: Masafumi Ito, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/065,278

(22) Filed: Mar. 9, 2016

(65) Prior Publication Data

US 2016/0269580 A1   Sep. 15, 2016

(30) Foreign Application Priority Data

Mar. 10, 2015   (JP) .................. 2015-046738

(51) Int. Cl.
*H04N 1/04*   (2006.01)
*H04N 1/00*   (2006.01)

(52) U.S. Cl.
CPC ....... *H04N 1/00896* (2013.01); *H04N 1/0032* (2013.01); *H04N 1/00904* (2013.01); *H04N 2201/0094* (2013.01)

(58) Field of Classification Search
CPC ............. H04N 1/00896; H04N 1/0032; H04N 1/00904
USPC ..................... 358/1.13, 1.14, 1.15
See application file for complete search history.

(56) References Cited

U.S. PATENT DOCUMENTS

| | | | |
|---|---|---|---|
| 6,542,705 B2* | 4/2003 | Fujita | G03G 15/2003 219/216 |
| 2006/0023245 A1 | 2/2006 | Sato et al. | |
| 2006/0051121 A1* | 3/2006 | Matsusaka | G03G 15/205 399/70 |
| 2008/0304852 A1* | 12/2008 | Kishi | G03G 15/2039 399/88 |

FOREIGN PATENT DOCUMENTS

| | | |
|---|---|---|
| JP | 2003-015478 A | 1/2003 |
| JP | 2006-035751 A | 2/2006 |
| JP | 2007-248729 A | 9/2007 |

* cited by examiner

*Primary Examiner* — Houshang Safaipour
(74) *Attorney, Agent, or Firm* — Merchant & Gould P.C.

(57) ABSTRACT

An image forming system includes an image forming apparatus, an option device, and a power supply line. The image forming apparatus includes an apparatus controller, an image forming unit, and an apparatus power supply. The apparatus power supply is configured to generate a control voltage that is supplied to the apparatus controller and an apparatus drive voltage that is supplied to the image forming unit. The option device includes a drive load, an option power supply, an option controller, and a detector. The option controller is configured to control the option power supply and receive the control voltage supplied from the apparatus power supply, via the power supply line. The detector is configured to transmit a detection signal to the option controller, the detection signal from among a plurality of different detection signals corresponding to operation statuses of the option power supply.

18 Claims, 7 Drawing Sheets

IMAGE FORMING SYSTEM

CROSS-REFERENCE TO RELATED APPLICATION

This application claims priority from Japanese Patent Application No. 2015-046738 filed on Mar. 10, 2015, the content of which is incorporated herein by reference in its entirety.

FIELD OF DISCLOSURE

The disclosure relates to a power supply control technique for an option device in an image forming system including an image forming apparatus and the option device.

BACKGROUND

A known image forming system includes an image forming apparatus and an option device connected to the image forming apparatus. For example, an image forming apparatus of an image forming system is connected to option devices, e.g., a plurality of sheet supply devices configured to supply sheets to the image forming apparatus and a plurality of post-processing devices configured to perform processing for sheets having images formed thereon by the image forming apparatus, e.g., binding and fastening using staples. Each of the sheet supply devices and the post-processing devices includes a power supply unit configured to be connected to commercial power supply. Power is supplied to control circuits of the sheet supply devices and the post-processing devices from the power supply units. A drive circuit of a sheet supply device is configured to drive a motor and a solenoid with power supplied from a power supply unit.

The image forming apparatus is configured to transmit a control signal for turning power on and off, for example, to a sheet supply device, via a communication interface. A control circuit of the sheet supply device determines a content of a received control signal, and starts or stops power supply from the power supply unit of the sheet supply device to its drive circuit in response to the control content.

SUMMARY

In the image forming system, the control circuit of the sheet supply device receives a control signal from the image forming apparatus and starts up (e.g., activates) or stops (e.g., deactivates) the drive circuit in association with operations of the image forming apparatus. To receive a control signal that will be transmitted from the image forming apparatus at any time, the control circuit needs to always monitor a control signal to be input via the communication interface. In other words, power needs to be continuously supplied from the power supply unit to the control circuit, to always keep the control circuit activated or operated. This may increase power consumption.

One or more aspects of the disclosure is to provide an image forming system that includes an image forming apparatus and an option device and may achieve power-saving.

The image forming system according to the disclosure may achieve power-saving.

DETAILED DESCRIPTION

Figure 1:
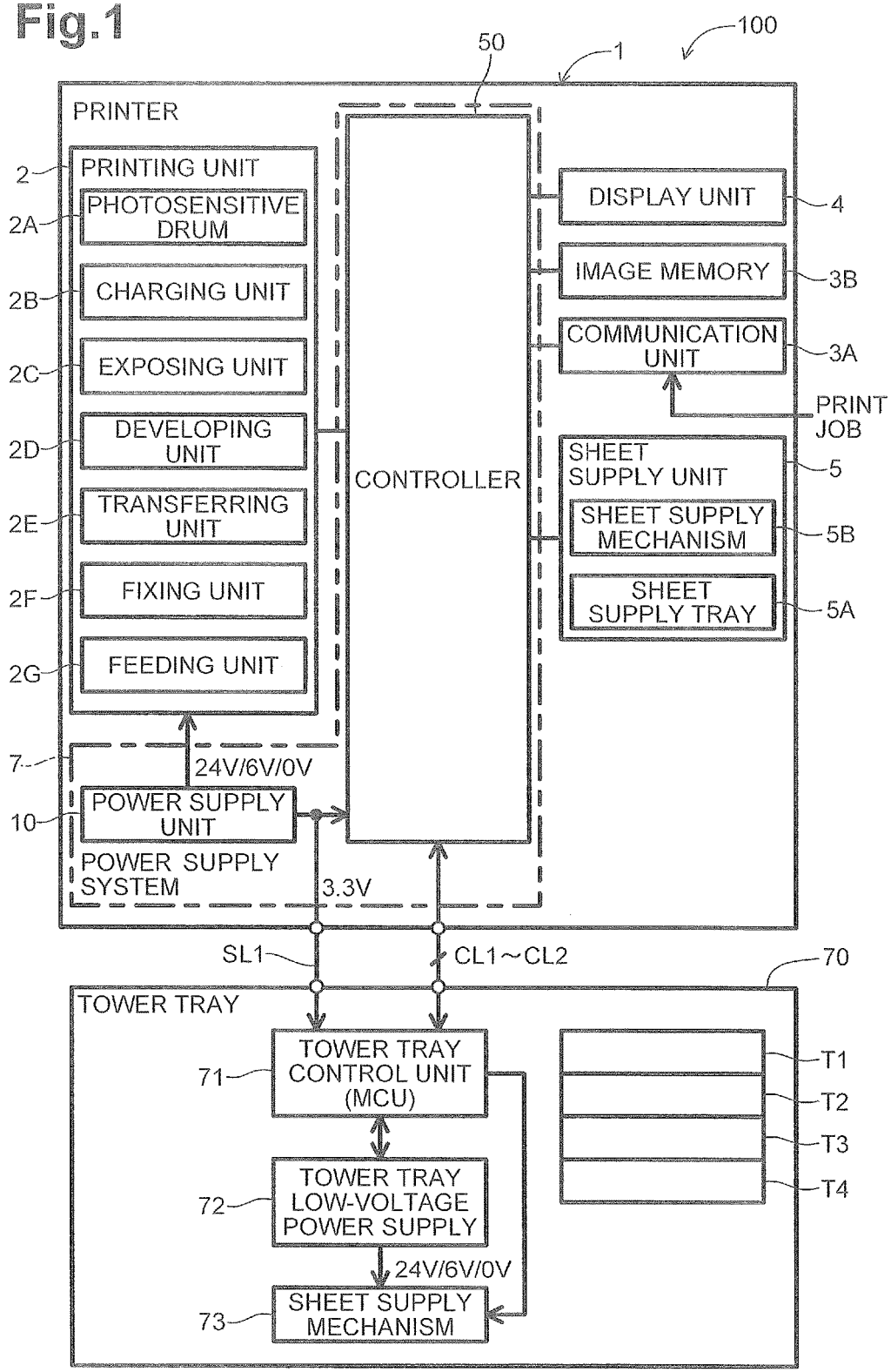
FIG. 1 is a block diagram illustrating configuration of a printer system according to an illustrative embodiment.

Illustrative embodiments will be described referring to the accompanying drawings. FIG. 1 depicts configuration of an image forming system, e.g., a printer system 100, according to an illustrative embodiment. As depicted in FIG. 1, the printer system 100 includes a printer 1 and a tower tray 70. The printer 1 is an example of an image forming apparatus. The tower tray 70 is an example of an option device. The image forming apparatus is not limited to a printer but may be, for example, a copier, a scanner, or a multi-functional device.

The printer 1 is connected to the tower tray 70 via a power supply line SL1 and a plurality of communication lines CL1 and CL2. The power supply line SL1 connects a voltage output terminal provided in the printer 1 and a voltage input terminal provided in the tower tray 70. Each communication line CL1 and CL2 connects a communication terminal provided in the printer 1 and a communication terminal provided in the tower tray 70.

The printer 1 includes an image forming unit, e.g., a printing unit 2, a communication unit 3A, an image memory 3B, a display unit 4, a sheet supply unit 5, and a power supply system 7. The power supply system 7 includes a power supply unit 10 and a controller 50. The power supply unit 10 functions as a power supply of the printer 1. The power supply unit 10 according to the illustrative embodiment also functions as a power supply of a tower tray control unit 71 of the tower tray 70.

The printing unit 2 includes a photosensitive drum 2A, a charging unit 2B configured to charge a surface of the photosensitive drum 2A, an exposing unit 2C configured to form an electrostatic latent image on the surface of the photosensitive drum 2A, a developing unit 2D configured to form a developer image by applying developer to the electrostatic latent image formed on the surface of the photosensitive drum 2A, a transferring unit 2E configured to transfer the developer image onto a sheet (e.g., a paper sheet and an overhead projector ("OHP") sheet), a fixing unit 2F configured to thermally fix the developer image transferred on a sheet with heat from a heater, and a feeding unit 2G configured to feed a sheet. The printing unit 2 is configured to print an image onto a sheet based on print data by driving, for example, the photosensitive drum 2A.

The communication unit 3A is configured to perform communication with an external information terminal (e.g. a personal computer) connected via a network. The communication unit 3A is configured to receive a print job from an external information terminal. The image memory 3B is configured to temporarily store print data included in a print job received from an information terminal. The display unit 4 includes, for example, a capacitive touch panel and a liquid crystal display panel, which are superposed on each other in a thickness direction of the display unit 4. This construction allows various input operations to be performed by touching or pressing an operation key displayed on the touch panel. The sheet supply unit 5 includes a sheet supply tray 5A and a sheet supply mechanism 5B. The sheet supply tray 5A is configured to store sheets to be used for printing. The sheet supply mechanism 5B includes a pickup roller and a sheet supply roller and is configured to supply a sheet to the feeding unit 2G. The feeding unit 2G includes a motor, a gear, a solenoid, a feeding roller, and a belt and is configured to feed a sheet supplied from the sheet supply unit 5 to the components or units of the printing unit 2.

The printer 1 is configured to control the controller 50 to process a print job, for example, as the communication unit 3A receives the print job from an information terminal. The controller 50 is configured to control the components or units of the printing unit 2 to execute printing processing, to print an image based on print data, onto a sheet.

The power supply system 7 is configured to supply drive voltages to, for example, the printing unit 2, the communication unit 3A, and the controller 50. A drive voltage of the fixing unit 2F and the feeding unit 2G of the printing unit 2, and the sheet supply unit 5 is, for example, 24 V. A drive voltage of the controller 50, the communication unit 3A, and the image memory 3B is, for example, 3.3 V.

The printer 1 has a ready mode, a print mode, a sleep mode, a deep sleep mode, and an off mode. In the ready mode, the printer 1 is placed in a state in which printing processing may be performed immediately in response to a print job. Therefore, in the ready mode, the power supply system 7 is operating. Energization of the fixing unit 2F, more specifically, a heater of the fixing unit 2F, is controlled by the controller 50 so that the fixing unit 2F may be maintained at a temperature at which fixing is possible or a temperature slightly lower than the temperature at which fixing is possible. In the print mode, the printing unit 2 is operating and printing processing is performed and energization of the heater of the fixing unit 2F is controlled by the controller 50 so that the fixing unit 2F may be maintained at a temperature at which fixing is possible.

In the sleep mode, the printer 1 is placed in a standby state in which a request for performing a print job or a user's input via the touch panel of the display unit 4 has not received for a predetermined time (e.g., 5 minutes) after printing processing is finished. The sleep mode is a power-saving mode in which energization of the heater of the fixing unit 2F is stopped, and the display unit 4 is in a non-displaying state as a backlight of the display panel is turned off. In the sleep mode, functions of the touch panel of the display unit 4 are activated to respond to a user's input promptly.

In the deep sleep mode, more power may be saved than the sleep mode when a request for executing a print job or a user's input has not received for a predetermined time (e.g., 5 minutes) since the printer 1 shifts to the sleep mode. As will be described in detail later, for example, only a portion of the power supply system 7 is operating in the deep mode and an apparatus drive voltage to be supplied from the power supply unit 10 to the printing unit 2 is reduced from 24 V to 6 V for power-saving. The controller 50 is configured to switch a principal processing unit from a main CPU (not depicted) to a sub CPU (not depicted) that consumes less power than the main CPU, for power-saving. In the deep sleep mode, functions of the touch panel of the display unit 4 are activated to respond to a user's input promptly.

In the off mode, more power may be saved than the deep sleep mode. As will be described in detail, a less portion of the power supply system 7 is operating in the off mode than in the deep sleep mode. For example, as a power button SW1 (refer to FIG. 2) is pressed by a user, the printer 1 shifts to the off mode.

Next, configuration of the tower tray 70 will be described. As depicted in FIG. 1, the tower tray 70 includes an option controller, e.g., a tower tray control unit 71, an option power supply, e.g., a tower tray low-voltage power supply 72, a drive load, e.g., a sheet supply mechanism 73, and a plurality of, for example, four, sheet supply trays T1, T2, T3, and T4.

The tower tray control unit 71 includes, for example, a microcomputer or micro controller unit (MCU). Hereinafter, the tower tray control unit 71 is referred to as "the MCU 71." The MCU 71 is configured to receive a control voltage of 3.3 V supplied from the power supply unit 10 of the printer 1, more specifically, from a main low-voltage power supply 20 (refer to FIG. 2) of the power supply unit 10, via the power supply line SL1.

The sheet supply mechanism 73 includes a pickup roller, a feeding roller, a drive source, e.g., a motor, a solenoid, a gear, and a fan. The sheet supply mechanism 73 is configured to be driven in association with the printing unit 2, based on controls of the MCU 71, and supply a sheet stored in a sheet supply tray T1-T4 to the printer 1, by driving, for example, the feeding roller.

The tower tray low-voltage power supply 72 is configured to generate an option drive voltage of 24 V to be supplied to the sheet supply mechanism 73, based on controls of the MCU 71. The tower tray low-voltage power supply 72 according to the illustrative embodiment is configured to change its mode based on controls of the MCU 71, and change a voltage value of the option drive voltage. For example, when the printer 1 is in the ready mode, the print mode, or the sleep mode, the tower tray low-voltage power supply 72 is placed in a mode (e.g., a normal mode) to supply an option drive voltage of 24 V. When the printer 1 is in the deep sleep mode, the tower tray low-voltage power supply 72 is placed in a first low output mode in which generation of an option drive voltage is stopped. When the printer 1 is in the off mode, the tower tray low-voltage power supply 72 is placed in the first low output mode. In this state, an option drive voltage is 0 V. The tower tray low-voltage power supply 72 has a second low output mode in which the tower tray low-voltage power supply 72 is configured to supply an option drive voltage of 6 V.

Figure 2:
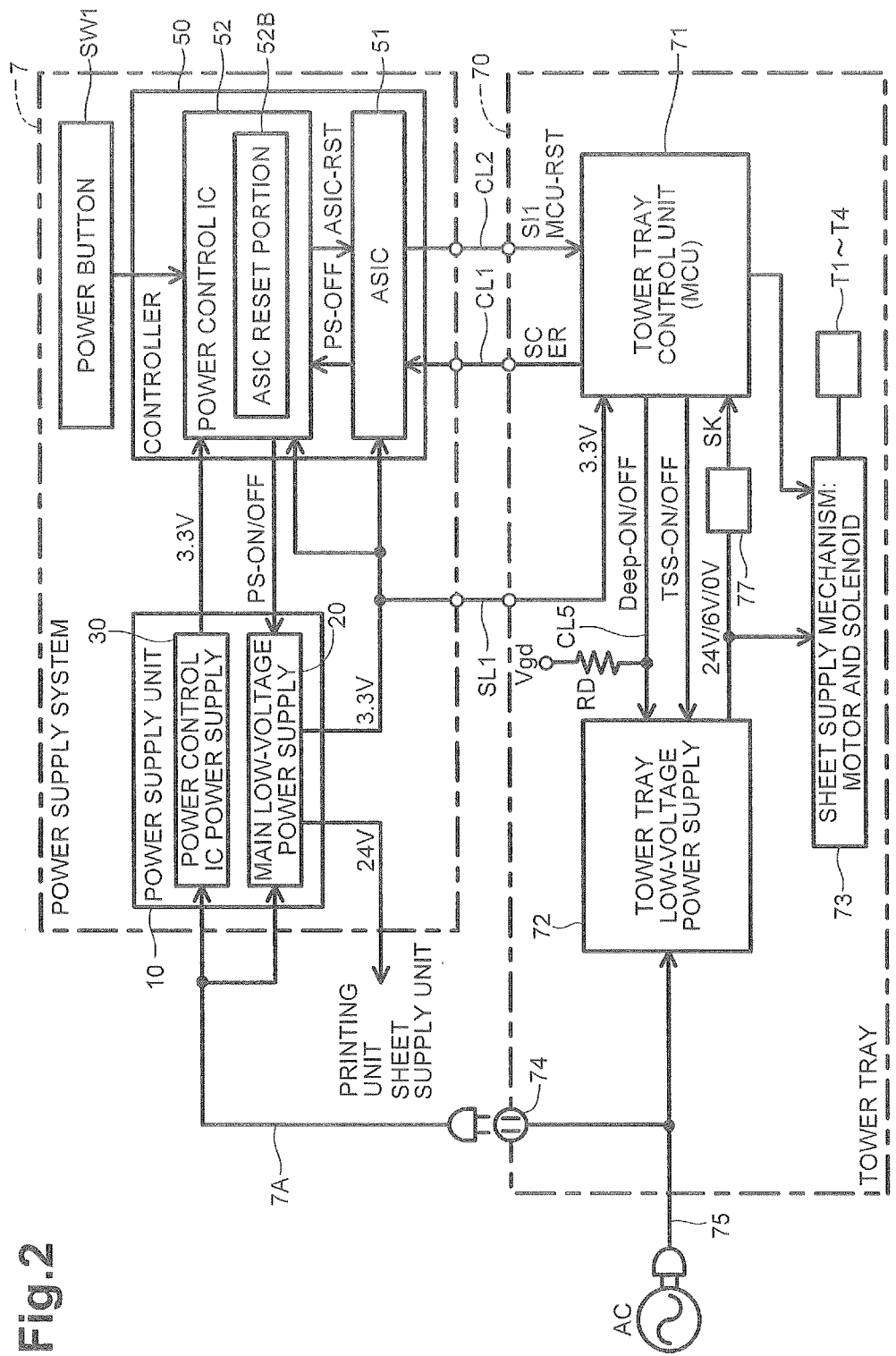
FIG. 2 is a block diagram illustrating power supply configuration of the printer system according to the illustrative embodiment.

More specifically, as depicted in FIG. 2, the tower tray low-voltage power supply 72 is configured to be turned on or off by a control signal (e.g., a tower tray low-voltage power supply signal TTS-ON/OFF) from the MCU 71. More specifically, the tower tray low-voltage power supply 72 is configured to control oscillation of a switching power supply to turn on or off. The MCU 71 according to the illustrative embodiment is configured to transmit a pulse signal PS1 for starting up or activating the tower tray low-voltage power supply 72 (hereinafter referred to as "an ON pulse") (refer to FIG. 4), to the tower tray low-voltage power supply 72, as a tower tray low-voltage power supply signal TTS-ON/OFF, to activate the tower tray low-voltage power supply 72. An ON pulse PS1 may be transmitted, for example, in time with the startup of the tower tray low-voltage power supply 72. The MCU 71 is configured to transmit a pulse signal PS2 for turning the tower tray low-voltage power supply 72 off (hereinafter referred to as "an OFF pulse") (refer to FIG. 4), to the tower tray low-voltage power supply 72, to make the tower tray low-voltage power supply 72 stop generating an option drive voltage. An OFF pulse PS2 may be transmitted, for example, in time with the deep sleep mode of the printer 1. In the illustrative embodiment, the pulse width of an ON pulse PS1 is shorter than that of an OFF pulse PS2. A time TM 1 during which an ON pulse PS1 is kept at a high level is, for example, 0.22 ms. A time TM 2 during which an OFF pulse PS2 is kept at a high level is, for example, 1.7 ms.

The tower tray low-voltage power supply 72 is configured to change a voltage value of an option drive voltage with a control signal (e.g., a Deep-ON/OFF signal) input from the MCU 71 via a signal line CL5. The MCU 71 is configured to transmit, for example, a low-level Deep-ON/OFF signal, to the tower tray low-voltage power supply 72, so that an option drive voltage is reduced from 24 V to 6 V and the tower tray low-voltage power supply 72 may be shifted to the second low output mode. The MCU 71 is configured to transmit, for example, a high-level Deep-ON/OFF signal, to the tower tray low-voltage power supply 72, so that an option drive voltage is increased to 24 V again, and tower tray low-voltage power supply 72 may be shifted to the normal mode.

A potential of a high-level Deep-ON/OFF signal is, for example, 3.3 V. A potential of a low-level Deep-ON/OFF signal is, for example, 0 V. The signal line CL5 is connected to a ground via a pull-down resistor RD. A ground voltage Vgd is supplied to the signal line CL5. Therefore, when a high-level Deep-ON/OFF signal is not transmitted from the MCU 71, a potential of the signal line CL5 is a ground potential (e.g., 0 V). As a potential of the signal line CL5 becomes the ground potential, the tower tray low-voltage power supply 72 is placed in a state that the tower tray low-voltage power supply 72 is receiving a low-level Deep-ON/OFF signal (e.g., 0 V), and outputs an option drive voltage of, for example, 6 V. The potential of a Deep-ON/OFF signal described above is an example and may be changed appropriately.

An option drive voltage output from the tower tray low-voltage power supply 72 is input to a comparator 77. The comparator 77 is configured to compare an option drive voltage with a reference voltage of, for example, 12 V, and transmit a comparison result to the MCU 71 as a detection signal SK. The comparator 77 is configured to output, for example, a high-level detection signal SK, to the MCU 71 when an option drive voltage is greater than or equal to a reference voltage and output a low-level detection signal SK to the MCU 71 when an option drive voltage is less than the reference voltage. Therefore, when an option drive voltage of 24 V is output from the tower tray low-voltage power supply 72, the comparator 77 transmits a high-level detection signal SK to the MCU 71. When an option drive voltage is 6 V or 0 V, the comparator 77 transmits a low-level detection signal SK to the MCU 71.

In the illustrative embodiment, a power supply capacity of the tower tray low-voltage power supply 72 is set to drive, for example, at least one sheet supply tray T1-T4 among a plurality of the sheet supply trays T1-T4. A plurality of the sheet supply trays T1-T4 does not operate at one time or at the same time. Therefore, a power supply capacity of the tower tray low-voltage power supply 72 is set to drive at least one sheet supply tray T1-T4. Thus, power-saving may be achieved for an option device, e.g., the tower tray 70. For example, four sheet supply trays T1-T4 may be arranged in this order from top to bottom in the tower tray 70. When a sheet is supplied to the printer 1 disposed above the tower tray 70 from the sheet supply tray T4 which is disposed lowermost among the four sheet supply trays T1-T4, rotation torque required to rotate the motor of the sheet supply mechanism 73 may become maximum. In other words, when a sheet is supplied from the lowermost sheet supply tray T4, power supplied from the tower tray low-voltage power supply 72 to the sheet supply mechanism 73 may become maximum. In this case, for example, a power supply capacity of the tower tray low-voltage power supply 72 may be preferably set to such a power supply capacity required to drive the sheet supply tray T4. A power supply capacity of the tower tray low-voltage power supply 72 is not limited thereto. For example, a power supply capacity of the tower tray low-voltage power supply 72 may be set to such a power supply capacity to simultaneously drive two or more sheet supply trays T1-T4.

Next, referring to FIGS. 2 and 3, configuration of the power supply system 7 will be described. The power supply system 7 includes a power switch, e.g., the power button SW1, the power supply unit 10, and the controller 50. The controller 50 includes an application specific integrated circuit (ASIC) 51 and a power control IC 52. The power button SW1 is configured to generate an ON signal or an OFF signal in response to the pressing of the power button SW1 and supply a signal to the power control IC 52.

As depicted in FIG. 2, the power supply unit 10 includes an apparatus power supply, e.g., the main body low-voltage power supply 20, and a power control IC power supply 30. The main low-voltage power supply 20 is constituted by, for example, a switching power supply, as depicted in FIG. 3. The main low-voltage power supply 20 includes a rectifying/smoothing circuit 21, a control IC 22, a voltage generating circuit 23, a transformer 24, a field effect transistor (FET) Q1, a rectifying/smoothing circuit 25, a voltage detecting circuit 26, and a DC-DC converter 27.

The main low-voltage power supply 20 is configured to rectify and smooth an AC voltage Vac of an AC power supply AC, to generate DC voltages of 24 V and 3.3 V in the ready mode, the print mode, and the sleep mode of the printer 1. The DC voltage of 24 V is output from a first output terminal OUT1. The DC voltage of 3.3 V is output from a second output terminal OUT2. The main low-voltage power supply 20 is configured to generate DC voltages of 6 V and 3.3 V in the deep sleep mode of the printer 1 for power saving. The DC voltages of 6 V and 3.3 V are output from the first output terminal OUT1 and the second output terminal OUT2, respectively.

The rectifying/smoothing circuit 21 is a so-called capacitor input type, and includes a bridge diode configured to rectify an AC voltage Vac (e.g., 240 V) of the AC power supply AC and a capacitor configured to smooth the rectified voltage and connected to the bridge diode. An output of the rectifying/smoothing circuit 21 is applied to a primary coil of the transformer 24.

The transistor Q1 is an N-channel MOSFET. The transistor Q1 is configured to be turned on or off in response to an on/off signal (e.g., a PWM signal) supplied to a gate of the transistor Q1 from the control IC 22. Accordingly, the primary side of the transformer 24 oscillates so that a voltage is induced at a secondary coil of the transformer 24.

The voltage generating circuit 23 is provided on the primary side of the transformer 24. The voltage generating circuit 23 is configured to supply a power supply voltage to the control IC 22 via a port Vcc by rectifying and smoothing a voltage induced at an auxiliary coil provided on the primary side of the transformer 24. The power supply voltage is supplied to an input port VH of the control IC 22 at the start of the main low-voltage power supply 20.

The rectifying/smoothing circuit 25 is configured to rectify and smooth a voltage induced at the secondary coil of the transformer 24, to generate an apparatus drive voltage, e.g., 24 V. The DC-DC converter 27 is configured to convert 24 V or 6 V input from the rectifying/smoothing circuit 25 via the voltage detecting circuit 26, into a control voltage, e.g., 3.3 V and to output 3.3 V.

The voltage detecting circuit 26 includes a photocoupler PC1 (for instance, a light emitting diode LED1). The voltage detecting circuit 26 is configured to make the light emitting diode LED1 of the photocoupler PC1 emit light in response to a detected level of 24 V output by the main low-voltage power supply 20. The photocoupler PC1 includes a phototransistor PT1 connected to a feedback port FB of the control IC 22. Therefore, a light signal of the light emitting diode LED1 is converted into an electric signal by the phototransistor PT1, and a detected value of the output of 24 V is fed back to the feedback port FB of the control IC 22.

The control IC 22 is configured to receive a power supply control signal PS-ON/OFF input to a control input port EN from a power control IC 52 (described below). The control IC 22 is configured to control an on/off signal output from an output port OUT to the transistor Q1, in response to the power supply control signal PS-ON/OFF, to control oscillation of the primary side of the transformer 24. In other words, the control IC 22 is configured to switch a state of the main low-voltage power supply 20 between an ON state and an OFF state, in response to the power supply control signal PS-ON/OFF. When the main low-voltage power supply 20 is in the ON state, the control IC 22 is configured to switch an output state of the apparatus drive voltage between a normal output (e.g., 24 V) and a low output (e.g., 6 V), in response to a command from the ASIC 51.

In an ON state of the main low-voltage power supply 20, an output of the apparatus drive voltage may be high (e.g., 24 V) or low (e.g., 6 V). The high output of the apparatus drive voltage corresponds to the ready mode, the print mode, and the sleep mode of the printer 1, and the primary side of the transformer 24 is oscillated to output 24 V and 3.3 V from the main low-voltage power supply 20. The low output of the apparatus drive voltage corresponds to the deep sleep mode, and the primary side of the transformer 24 is oscillated and the time in which the transistor Q1 is turned on and off is controlled by the control IC 22, to output 6 V and 3.3 V from the main low-voltage power supply 20. An OFF state of the main low-voltage power supply 20 corresponds to the off mode of the printer 1. In the OFF state, an output of the apparatus drive voltage is 0 V, and oscillation of the transformer 24 is stopped to stop an output of the main low-voltage power supply 20.

The tower tray low-voltage power supply 72 is constituted by, for example, a switching power supply, similar to the main low-voltage power supply 20. The tower tray low-voltage power supply 72 includes a rectifying/smoothing circuit, a control IC, a voltage generating circuit, a transformer, a FET, a rectifying/smoothing circuit, and a voltage detecting circuit, similar to those of the main low-voltage power supply 20. The MCU 71 is configured to control the tower tray low-voltage power supply 72.

Next, configuration of the power control IC power supply 30 will be described. The power control IC power supply 30 is a low-capacity power supply and has a power supply capacity smaller than that of the main low-voltage power supply 20. Regardless of operating states of the main low-voltage power supply 20, in other words, regardless of modes of the printer 1, the power control IC power supply 30 is configured to supply power to the power control IC 52.

The power control IC power supply 30 is configured to supply power from the AC power supply AC to the power control IC 52 of the controller 50 and a control signal transmission unit 53 in the respective modes of the printer 1.

Figure 3:
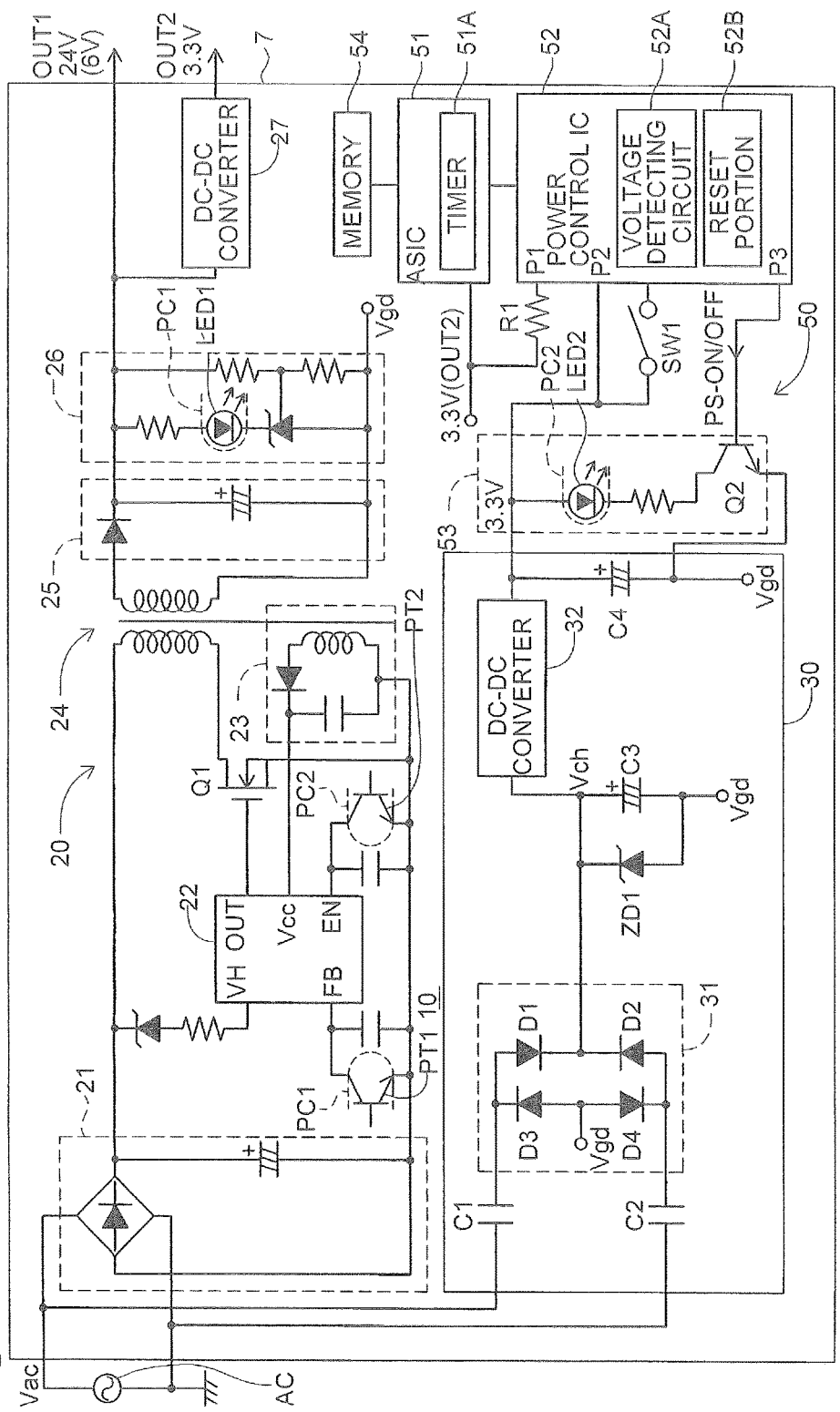
FIG. 3 is a circuit diagram illustrating power supply configuration according to the illustrative embodiment.

For example, as depicted in FIG. 3, the power control IC power supply 30 includes a first capacitor C1, a second capacitor C2, a rectifier 31, a Zener diode ZD1, a smoothing capacitor C3, a DC-DC converter 32, and a storage capacitor C4. The rectifier 31 is connected between the first capacitor C1 and the second capacitor C2. The rectifier 31 is configured to rectify the AC voltage Vac applied to the capacitors C1 and C2. The rectifier 31 includes a bridge circuit comprising four diodes D1, D2, D3, and D4. Anodes of the diodes D3 and D4 are connected to a ground. A ground voltage Vgd is supplied to the anodes of the diodes D3 and D4.

The smoothing capacitor C3 is connected to the rectifier 31. The smoothing capacitor C3 is configured to smooth the rectified AC voltage to generate a smoothed voltage Vch (e.g., 5 V). The Zener diode ZD1 is configured to suppress the smoothed voltage Vch from rising when the AC voltage Vac of the AC power supply AC rises. The DC-DC converter 32 is configured to convert the smoothing voltage Vch into 3.3 V, which is supplied to the power control IC 52 and the control signal transmission unit 53.

The storage capacitor C4 is connected to an output side of the DC-DC converter 32. The storage capacitor C4 is configured to be charged with 3.3 V output from the DC-DC converter 32. The charged power of the storage capacitor C4 is used for a drive current for a light emitting diode LED2 of a photocoupler PC2 of the control signal transmission unit 53, for example, when the printer 1 shifts from the off mode to the ready mode. The capacitance of the smoothing storage capacitor C3 and the storage capacitor C4 may be appropriately selected, so that it may be possible to accumulate an amount of power in the off mode.

Next, configuration of the controller 50 will be described. As depicted in FIG. 3, the controller 50 includes an application specific integrated circuit (ASIC) 51, a power control IC 52, a control signal transmission unit 53, and a memory 54. The ASIC 51 is configured to mainly control the printing unit 2 of the printer 1 and the MCU 71. The ASIC 51 includes a timer 51A. The timer 51A is configured to measure a time when the printer 1 shifts from the ready mode to the sleep mode and from the sleep mode to the deep sleep mode.

The ASIC 51 is configured to receive power of 3.3 V from the DC-DC converter 27 of the main low-voltage power supply 20 in respective modes other than the off mode. In other words, the ASIC 51 is configured to operate in respective modes other than the off mode with power supply and stop with power supply stopped as an output of the main low-voltage power supply 20 is stopped, e.g., as the printer 1 shifts to the off mode.

The power control IC 52 includes a voltage detecting circuit 52A and an ASIC reset portion 52B. A port P1 of the power control IC 52 is connected to an output terminal OUT2 of the DC-DC converter 27, via a resistor R1. The power control IC 52 is configured to detect 3.3 V from outputs of the output terminal OUT2, and monitor outputs of the main low-voltage power supply 20. A power supply port P2 of the power control IC 52 is connected to an output side of the power control IC power supply 30. Regardless of modes of the printer 1, power is supplied from the power control IC power supply 30 to the power control IC 52.

The power control IC 52 is configured to control switching between an operation mode in which the main low-voltage power supply 20 is operated, and a stop mode in which oscillation of the main low-voltage power supply 20 is stopped, in response to switching of modes of the printer 1. More specifically, the control signal transmission unit 53 includes the photocoupler PC2 (for instance, the light emitting diode LED2) and a transistor Q2. An anode of the light emitting diode LED2 is connected to a power supply line of 3.3 V from the power control IC power supply 30. The light emitting diode LED2 constitutes the photocoupler PC2 together with the phototransistor PT2 connected to the control input port EN of the control IC 22 of the main low-voltage power supply 20. The transistor Q2 is connected between a cathode of the light emitting diode LED2 and a ground. As a pulsed power supply control signal PS-ON/OFF is output from a control port P3 of the power control IC 52 to a base of the transistor Q2, the power supply control signal PS-ON/OFF is optically transmitted via the photocoupler PC2 and is input to the control input port EN of the control IC 22. Therefore, as the power control IC 52 outputs a pulsed power supply control signal PS-ON/OFF to the control IC 22, the main low-voltage power supply 20 may be switched between on and off. Regardless of whether the main low-voltage power supply 20 is turned on or off, power is supplied from the power control IC power supply 30 to the power control IC 52 and the control signal transmission unit 53.

The memory 54 includes a read-only memory (ROM) and a random-access memory (RAM). The ROM stores various programs to be executed by the ASIC 51. The RAM stores various data when programs are executed. The power button SW1 is connected between the control signal transmission unit 53 and the power control IC 52. The power button SW1 is configured to output an ON signal or an OFF signal to the power control IC 52 in association with the pressing of the power button SW1. The main low-voltage power supply 20 may be switched between on and off, in other words, setting and cancellation of the off mode may be instructed to the power control IC 52, as a user presses or operates the power button SW1.

The printer system 100 or the printer 1 includes a dedicated power cord 7A configured to connect the printer 1 and the tower tray 70, as depicted in FIG. 2. The tower tray 70 includes a connecting portion 74 to which the dedicated power cord 7A is connected, and a power cord 75 including a plug. To use the printer system 100, the power cord 75 of the tower tray 70 is connected to the AC power supply AC, and the dedicated power cord 7A is connected to the connecting portion 74. The printer 1 is connected to the AC power supply AC via the dedicated power cord 7A. Thus, the power cord routing for connecting the printer system 100 to the AC power supply AC may be facilitated. Connection of the printer system 100 to the AC power supply AC is not limited a manner described above. For example, the power supply system 7 and the tower tray 70 may be connected separately to the AC power supply AC.

Next, transitions of states of the tower tray 70 will be described referring to FIG. 5. "PS 72" represents the tower tray low-voltage power supply 72 in FIG. 5. For example, "PS 72: 0 V" represents that generation of an option drive voltage is stopped. "TTS SIGNAL" represents a tower tray low-voltage power supply signal TTS-ON/OFF.

Figure 5:
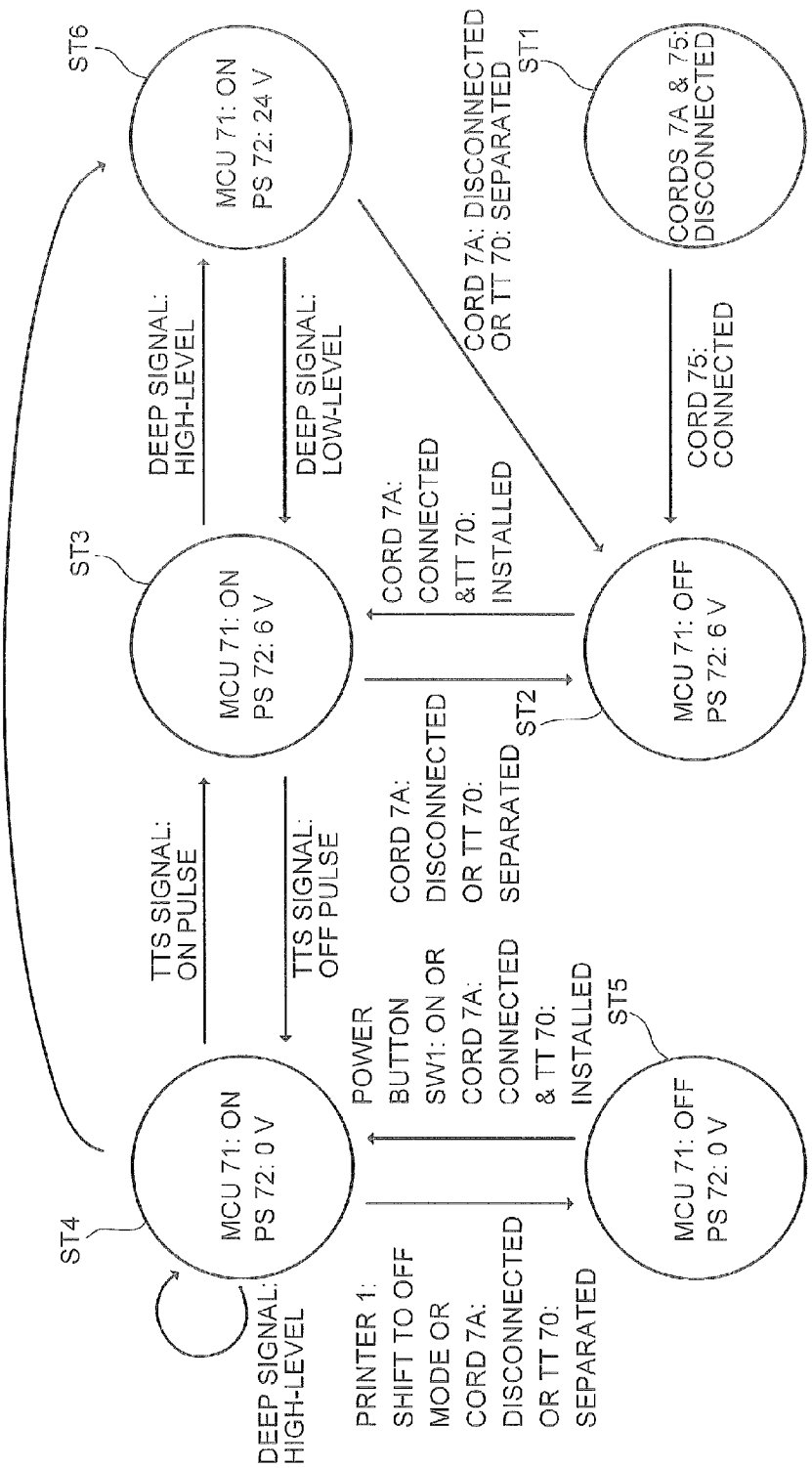
FIG. 5 is a diagram illustrating transition of states in power supply controls for a tower tray according to the illustrative embodiment.

For example, a state ST1 depicted in a lower right portion of FIG. 5 represents a state in which in two cords, e.g., the dedicated power cord 7A and the power cord 75, at least the power cord 75 is not connected to the AC power supply AC. As the power cord 75 is connected to the AC power supply AC in the state ST1, the tower tray 70 is placed in a state ST2. In the state ST2, power is supplied to the tower tray low-voltage power supply 72. The MCU 71 is stopped with no control voltage supplied from the main low-voltage power supply 20, immediately after the power cord 75 is connected to the AC power supply AC. Therefore, a potential of the signal line CL5 is the ground potential. The tower tray low-voltage power supply 72 is placed in the second low output mode and generates an option drive voltage of 6 V. When the dedicated power cord 7A is not connected, the tower tray 70 remains in the state ST2 and the power supply unit 10 of the printer 1 is stopped.

Then, the tower tray 70 is placed into a state ST3, as the tower tray 70 is installed to the printer 1 and the dedicated power cord 7A of the printer 1 is connected to the connecting portion 74 in the state ST2, or as the tower tray 70 has already been installed to the printer 1 and the dedicated power cord 7A of the printer 1 has been connected to the connecting portion 74 in the state ST2 (e.g., the tower tray 70 has been installed to the printer 1 before the tower tray 70 is placed in the state ST2 and the dedicated power cord 7A of the printer 1 has been connected to the connecting portion 74 before the tower tray 70 is placed in the state ST2). In the state ST3, the power control IC power supply 30 and the main low-voltage power supply 20 are activated with power supply via the power cord 75 and the dedicated power cord 7A. The power control IC power supply 30 supplies 3.3 V to the power control IC 52, to activate the power control IC 52. The main low-voltage power supply 20 generates, after activated, a voltage of 24 V (e.g., an apparatus drive voltage) for a power system, and a voltage of 3.3 V (e.g., a control voltage) for a logic system. The main low-voltage power supply 20 supplies 24 V to the printing unit 2 and the sheet supply unit 5. The main low-voltage power supply 20 supplies 3.3 V to the ASIC 51, the power control IC 52 and the MCU 71.

As the voltage detecting circuit 52A of the power control IC 52 (refer to FIG. 3) detects 3.3 V, the ASIC reset portion 52B of the power control IC 52 transmits a high-level ASIC reset signal ASIC-RST, to the ASIC 51, to activate the ASIC 51. After activated, the ASIC 51 transmits a high-level MCU reset signal MCU-RST to the MCU 71 via the communication line CL2, to activate the MCU 71.

As described above, the power control IC 52 is activated with power supply from the power control IC power supply 30. Accordingly, even when the main low-voltage power supply 20 is not activated, the power control IC 52 may detect whether the power button SW1 is turned on or off. In the state ST3, as the dedicated power cord 7A is pulled off, the main low-voltage power supply 20 stops and the MCU 71 that receives power supply from the main low-voltage power supply 20 also stops. Accordingly, the tower tray 70 is placed in the state ST2. In the state ST3, as the tower tray 70 is separated from the printer 1, the main low-voltage power supply 20 will not be able to supply a control voltage of 3.3 V to the MCU 71 of the tower tray 70 via the power supply line SL1, so that the MCU 71 stops. Accordingly, the tower tray 70 is placed in the state ST2.

The ASIC 51 according to the illustrative embodiment is configured to execute an initial setting as the ASIC 51 is activated. An initial setting is, for example, to correct error in time information to be used for internal processing. After the ASIC 51 completes an initial setting and the MCU 71 is activated, the MCU 71 transmits a high-level Deep-ON/OFF signal (e.g., 3.3 V) to the tower tray low-voltage power supply 72 in the state ST3, to determine an output state of the tower tray low-voltage power supply 72, as will be described below. The tower tray 70 is placed in the normal mode, e.g., a state ST6. The comparator 77 outputs a high-level detection signal SK (described below) to the MCU 71. In the state ST6, the ASIC 51 transmits a command signal SI1 for stopping an operation of the tower tray low-voltage power supply 72, to the MCU 71, via the communication line CL2, to turn the whole system 100 off. The MCU 71 that has received the command signal SI1 for stopping an operation of the tower tray low-voltage power supply 72 transmits a low-level Deep-ON/OFF signal (e.g., 0 V) to the tower tray low-voltage power supply 72. The tower tray 70 temporarily shifts to the second low output mode, e.g., the state ST3. Then, in the state ST3, the MCU 71 transmits an OFF pulse PS2 (e.g., a tower tray low-voltage power supply signal TTS-ON/OFF) to the tower tray low-voltage power supply 72. The tower tray low-voltage power supply 72 shifts to the first low output mode (e.g., 0 V), e.g., a state ST4. The comparator 77 outputs a low-level detection signal SK (described below) to the MCU 71. In the state ST2, when the tower tray 70 is installed to the printer 1, the dedicated power cord 7A of the printer 1 is connected to the connecting portion 74, and the power cord 75 is connected to the AC power supply AC, a state of the MCU 71 and the tower tray low-voltage power supply 72 automatically shifts to the state ST3, the state ST6, the state ST3, the state ST4, and the state ST5 in this order, without a user's particular operation.

Until the ASIC 51 receives a complete command SC (described below) from the MCU 71 placed in the state ST4, the ASIC 51 regularly transmits a command signal SD for stopping an operation of the tower tray low-voltage power supply 72 to the MCU 71 via the communication line CL2. For example, even when the ASIC 51 is operated with the dedicated power cord 7A of the printer 1 connected to the connecting portion 74 and the power cord 75 connected to the AC power supply AC, the printer 1 and the tower tray 70 are electrically disconnected as the tower tray 70 is separated from the printer 1. In this case, the MCU 71 is stopped. Therefore, even when the ASIC 51 transmits a command signal SD for stopping an operation of the tower tray low-voltage power supply 72 to the MCU 71, the MCU 71 will not be able to receive a command signal SI1. Therefore, in the state ST2, as the printer 1 and the tower tray 70 are electrically connected as the tower tray 70 is installed to the printer 1, a state becomes the state ST3. The MCU 71 that is activated in the state ST3 receives a command signal SI1 from the ASIC 51 to stop an operation of the tower tray low-voltage power supply 72. Then, a state becomes the state ST4. Until the ASIC 51 receives a complete command SC representing that an operation of the tower tray low-voltage power supply 72 is stopped, from the MCU 71, the ASIC 51 transmits a command signal SI1 for stopping an operation of the tower tray low-voltage power supply 72 to the MCU 71 repeatedly.

In the state ST4, as the dedicated power cord 7A of the printer 1 is disconnected, the tower tray 70 is separated from the printer 1, or the printer 1 shifts to the off mode, the tower tray 70 is placed in the state ST5. In the state ST5, the MCU 71 is stopped without a control voltage supplied from the main low-voltage power supply 20. For example, when the printer 1 shifts to the off mode, the ASIC 51 transmits a low-level MCU reset signal MCU-RST (refer to FIG. 2) for stopping (or resetting) the MCU 71, to the MCU 71 via the communication line CL2, to stop the MCU 71. The ASIC 51 transmits a power OFF command PS-OFF for stopping the main low-voltage power supply 20 to the power control IC 52. The power control IC 52 transmits a pulsed power supply control signal PS-ON/OFF for stopping the main low-voltage power supply 20, to the control IC 22 of the main low-voltage power supply 20, to stop the main low-voltage power supply 20. Thus, when the MCU 71 shifts from the state ST4 in which the MCU 71 is activated and the tower tray low-voltage power supply 72 is placed in the first low output mode, to the state ST5 in which the MCU 71 is stopped and the tower tray low-voltage power supply 72 is placed in the first low output mode, the printer 1 shifts to the off mode. In other words, in the state ST5, the printer 1 is in the off mode, and the tower tray low-voltage power supply 72 is in the first low output mode.

In the state ST5, when the dedicated power cord 7A of the printer 1 is connected to the connecting portion 74 in a state in which the tower tray 70 is installed to the printer 1 and the power cord 75 is connected to the AC power supply AC, or the power button SW1 is turned on while the printer 1 is in the off mode, the tower tray 70 is placed in the state ST4. When the dedicated power cord 7A of the printer 1 is connected to the connecting portion 74 in a state in which the tower tray 70 is installed to the printer 1 and the power cord 75 is connected to the AC power supply AC, power is supplied to the main low-voltage power supply 20 to activate the main low-voltage power supply 20. A control voltage of 3.3 V is supplied from the main low-voltage power supply 20 that is activated, to the MCU 71, to activate the MCU 71. When the power button SW1 is turned on while the printer 1 is in the off mode, the power control IC 52 that detects that the power button SW1 is turned on, transmits a pulsed power supply control signal PS-ON/OFF for activating the main low-voltage power supply 20, to the control IC 22 of the main low-voltage power supply 20, to activate the main low-voltage power supply 20. A control voltage of 3.3 V is supplied from the main low-voltage power supply 20 that is activated, to the MCU 71, to activate the MCU 71. In the state ST4, the printer 1 is in the deep sleep mode, and the tower tray low-voltage power supply 72 is in the first low output mode.

When a state shifts from the state ST5 to the state ST4, the MCU 71 transmits a high-level Deep-ON/OFF signal (e.g., 3.3 V) to the tower tray low-voltage power supply 72 to determine whether the power cord 75 is connected to the AC power supply AC, as will be described later, in the illustrative embodiment. The MCU 71 transmits an ON pulse PS1 for activating the tower tray low-voltage power supply 72, to the tower tray low-voltage power supply 72. When the power cord 75 is connected to the AC power supply AC, an option drive voltage of the tower tray low-voltage power supply 72 increases from 0 V to 24 V, and a state will shift from the state ST4 to the state ST6. The comparator 77 outputs a high-level detection signal SK (described below) to the MCU 71. After a state shifts from the state ST4 to the state ST6, the ASIC 51 transmits a command signal SI1 for stopping an operation of the tower tray low-voltage power supply 72 to the MCU 71, via the communication line CL2, to place the printer 1 in the deep sleep mode and stop the tower tray low-voltage power supply 72. The MCU 71 that has received the command signal SD for stopping an operation of the tower tray low-voltage power supply 72 transmits a low-level Deep-ON/OFF signal to the tower tray low-voltage power supply 72. The tower tray low-voltage power supply 72 temporarily shifts to the second low output mode, e.g., the state ST3. Thereafter, in the state ST3, the MCU 71 transmits an OFF pulse PS2 to the tower tray low-voltage power supply 72. The tower tray low-voltage power supply 72 shifts to the first low output mode (e.g., 0 V), and placed in the state ST4. The comparator 77 outputs a low-level detection signal SK (described below) to the MCU 71. In the state ST5, when the dedicated power cord 7A of the printer 1 is connected to the connecting portion 74 in a state in which the tower tray 70 is installed to the printer 1 and the power cord 75 is connected to the AC power supply AC, or the power button SW1 is turned on while the printer 1 is in the off mode, a state automatically shifts to the state ST4, the state ST6, the state ST3, and the state ST4 in this order, without a user's particular operation.

In the state ST4, as the printer 1 receives a printing request or a user's input via a control panel (not depicted), the tower tray low-voltage power supply 72 receives an ON pulse PS1 for activating the tower tray low-voltage power supply 72 from the MCU 71 and is placed in the second low output mode. The tower tray low-voltage power supply 72 generates an option drive voltage of 6 V. In other words, the tower tray 70 is placed in the state ST3.

In the state ST3, as the MCU 71 transmits a high-level (3.3 V) Deep-ON/OFF signal to the tower tray low-voltage power supply 72, the tower tray 70 is placed in the state ST6. The tower tray low-voltage power supply 72 is in the normal mode, and generate an option drive voltage of 24 V. Thus, the option drive voltage of 24 V to be supplied to drive loads, e.g., the motor and the solenoid of the sheet supply mechanism 73 of the tower tray 70, is generated. The main low-voltage power supply 20 receives a command from the ASIC 51, via the control IC 22, and increases an apparatus drive voltage from 6 V to 24 V. Thus, the printer 1 is placed in the ready mode. In the state ST6, the printer 1 is in any one of the ready mode, the print mode, and the sleep mode, and the tower tray 70 is in the normal mode. When the printer 1 placed in the deep sleep mode in the state ST4 shifts to the ready mode, a state automatically shifts to the state ST3 and then to the state ST6 without a user's particular operation.

In the state ST6, as the dedicated power cord 7A is pulled off, the main low-voltage power supply 20 stops, and the MCU 71 that receives power supply from the main low-voltage power supply 20 also stops. As the potential of the signal line CL5 becomes the ground potential, the tower tray low-voltage power supply 72 is placed in a state that the tower tray low-voltage power supply 72 is receiving a low-level Deep-ON/OFF signal and the option drive voltage becomes 6 V. Thus, the tower tray low-voltage power supply 72 is placed in the second low output mode, e.g., the state ST2, and the main low-voltage power supply 20 and the power control IC power supply 30 of the printer 1 are stopped.

In the state ST6, as the tower tray 70 is separated from the printer 1, the main low-voltage power supply 20 will not be able to supply a control voltage of 3.3 V to the MCU 71 of the tower tray 70, via the power supply line SL1. Therefore, the MCU 71 stops. As a potential of the signal line CL5 becomes the ground potential, the tower tray low-voltage power supply 72 is placed in a state that the tower tray low-voltage power supply 72 is receiving a low-level Deep-ON/OFF signal, and the option drive voltage becomes 6 V. Thus, the tower tray low-voltage power supply 72 is placed in the second low output mode, e.g., the state ST2, and the main low-voltage power supply 20 and the power control IC power supply 30 of the printer 1 are maintained operated.

In the state ST6, when the printer 1 shifts from the sleep mode to the deep sleep mode, or the power button SW1 is turned off, the ASIC 51 transmits a command to the control IC 22, to reduce an apparatus drive voltage of the main low-voltage power supply 20 from 24 V to 6 V. The printer 1 is placed in the deep sleep mode. The ASIC 51 transmits a command signal SI1 for stopping an operation of the tower tray low-voltage power supply 72 to the MCU 71, via the communication line CL2. The MCU 71 that has received the command signal SI1 for stopping an operation of the tower tray low-voltage power supply 72 transmits a low-level Deep-ON/OFF signal (e.g., 0 V) to the tower tray low-voltage power supply 72. The tower tray low-voltage power supply 72 temporarily shifts to the second low output mode, e.g., the state ST3. Thereafter, in the state ST3, the MCU 71 transmits an OFF pulse PS2 to the tower tray low-voltage power supply 72. The tower tray low-voltage power supply 72 shifts to the first low output mode (e.g., 0 V) and is placed in the state ST4.

When the printer 1 placed in the sleep mode in the state ST6 shifts to the deep sleep mode, a state automatically shifts to the state ST3 and then to the state ST4, without a user's particular operation. When the power button SW1 is turned off in the state ST6, a state automatically shifts to the state ST3, the state ST4, and the state ST5 in this order, without a user's particular operation.

As described above, the MCU 71 may transmit a high-level Deep-ON/OFF signal to the tower tray low-voltage power supply 72 in the state ST4. The tower tray low-voltage power supply 72 is stopped, so that the tower tray 70 maintains the state ST4. In the state ST4, as the MCU 71 transmits an ON pulse PS1 to the tower tray low-voltage power supply 72 in a state in which the MCU 71 transmits a high-level Deep-ON/OFF signal to the tower tray low-voltage power supply 72, the tower tray 70 is placed in the state ST6. An option drive voltage of the tower tray low-voltage power supply 72 increases from 0 V to 24 V. The tower tray 70 shifts to a respective state ST1-ST6 according to conditions as described above.

In the state transition as depicted in FIG. 5, there are two different ways for the MCU 71 to shift from a stopped state to an active state. One of the two ways may be as follows. A state of the MCU 71 shifts to the state ST3 as the tower tray 70 is installed to the printer 1 and the dedicated power cord 7A of the printer 1 is connected to the connecting portion 74 in the state ST2 or as the tower tray 70 has already been installed to the printer 1 and the dedicated power cord 7A of the printer 1 has been connected to the connecting portion 74 in the state ST2 (e.g., the tower tray 70 has been installed to the printer 1 before the tower tray 70 is placed in the state ST2 and the dedicated power cord 7A of the printer 1 has been connected to the connecting portion 74 before the tower tray 70 is placed in the state ST2). In this case, the tower tray low-voltage power supply 72 is placed in the second low output mode (e.g., 6 V) in the state ST3. The other one of the two ways may be as follows. In the state ST5, as the dedicated power cord 7A of the printer 1 is connected to the connecting portion 74 in a state in which the tower tray 70 is installed to the printer 1 and the power cord 75 is connected to the AC power supply AC, or the power button SW1 is turned on while the printer 1 is in the off mode, a state of the MCU 71 shifts to the state ST4. In this case, the tower tray low-voltage power supply 72 is placed in the first low output mode (e.g., 0 V) in the state ST4.

To appropriately control the tower tray low-voltage power supply 72, the MCU 71 needs to detect a mode of the tower tray low-voltage power supply 72 after activated. The tower tray 70 according to the illustrative embodiment includes the comparator 77 configured to output a detection signal SK according to voltage levels of an option drive voltage output from the tower tray low-voltage power supply 72. The comparator 77 is configured to compare an option drive voltage with a reference voltage, e.g., 12 V, and to transmit a comparison result to the MCU 71 as a detection signal SK. The tower tray low-voltage power supply 72 is configured to switch an option drive voltage among three levels of 24 V, 6 V, and 0 V. Therefore, the MCU 71 may determine the normal mode and a low output mode (including the first low output mode and the second low output mode), based on a detection signal SK of the comparator 77. However, the MCU 71 will not be able to determine the first low output mode (e.g., 0 V) and the second low output mode (e.g., 6 V) based on a detection signal SK. The MCU 71 according to the illustrative embodiment may determine, after activated, a mode of the tower tray low-voltage power supply 72 using a Deep-ON/OFF signal. Thus, for determination for the low output mode, such a comparator 77 may not have to be additionally provided that is configured to compare an option drive voltage with a reference voltage of, for example, 3 V, and transmit a comparison result to the MCU 71 as a detection signal SK. Therefore, circuit configuration may be facilitated and manufacturing costs may be reduced.

Next, an example of processing for determining a mode of the tower tray low-voltage power supply 72 after the MCU 71 is activated will be described referring to FIG. 6. In step 13 (hereinafter, "step" is abbreviated as "S") of FIG. 6, the MCU 71 transmits a high-level Deep-ON/OFF signal (e.g., 3.3 V) to the tower tray low-voltage power supply 72. Thus, when the tower tray 70 is placed in, for example, the state ST3, the tower tray 70 is then placed in the state ST6, and the option drive voltage becomes 24 V. When the tower tray 70 is placed in, for example, the state ST4, a state may be maintained at the state ST4, and an option drive voltage is 0 V.

The MCU 71 determines whether a detection signal SK output from the comparator 77 is at high-level (S15). When the detection signal SK is at high-level (S15: YES), the MCU 71 determines that an immediately preceding mode of the tower tray low-voltage power supply 72 is the second low output mode, in other words, the tower tray low-voltage power supply 72 was placed in the state ST3 (S17).

A state of the tower tray low-voltage power supply 72 is changed (e.g., from the state ST3 to the state ST6), with the execution of S13. Accordingly, the MCU 71 then executes a control to place the state of the tower tray low-voltage power supply 72 back to the state ST3. When the MCU 71 detects the second low output mode in S17, the MCU 71 performs a process to reduce a Deep-ON/OFF signal (e.g., 3.3 V to 0 V) (S19). As the tower tray low-voltage power supply 72 receives a Deep-ON/OFF signal of 0 V via the signal line CL5, the tower tray low-voltage power supply 72 performs a process to reduce the option drive voltage (e.g., 24 V to 6 V), and is placed in the second low output mode. The MCU 71 transmits an OFF pulse PS2 to the tower tray low-voltage power supply 72 (S21). The tower tray low-voltage power supply 72 shifts to the first low output mode (e.g., 0 V).

The MCU 71 determines a signal level of a detection signal SK input from the comparator 77 (S23). The MCU 71 repeats determination in S23 until a low-level the detection signal SK is input from the comparator 77 (S23: NO). When the MCU 71 detects a low-level the detection signal SK from the comparator 77 (S23: YES), the MCU 71 transmits a complete command SC (refer to FIG. 2) representing that the tower tray low-voltage power supply 72 has been shifted to the first low output mode, to the ASIC 51 (S25). Thus, the ASIC 51 may appropriately control the tower tray low-voltage power supply 72, via the MCU 71.

In S15, when a detection signal SK is at low-level (S15: NO), there is a high probability that the tower tray low-voltage power supply 72 is in the first low output mode, e.g., the state ST4. As depicted in FIG. 2, the printer 1 includes the dedicated power cord 7A configured to connect the printer 1 and the tower tray 70. The tower tray 70 includes the connecting portion 74 to which the dedicated power cord 7A is connected, and the power cord 75 with a plug. In the printer system 100 as structured above, for example, when a user mistakenly connects the cords 7A and 75 such that the user directly connects the dedicated power cord 7A to the AC power supply AC, and does not connect the power cord 75, the MCU 71 is activated with power supply from the main low-voltage power supply 20 of the printer 1 but the tower tray low-voltage power supply 72 stops with no power supplied because the power cord 75 is not connected.

On the assumption that a user mistakenly makes connection of the cords 7A and 75, the MCU 71 needs to determine, after activated, whether an option drive voltage is 0 V because the tower tray low-voltage power supply 72 is placed in the first low output mode, or an option drive voltage is not generated because the power cord 75 is not connected. In other words, the MCU 71 needs to determine whether the power cord 75 is connected or disconnected. The MCU 71 according to the illustrative embodiment is configured to determine, after activated, not only a mode of the tower tray low-voltage power supply 72 but also connection or disconnection of the power cord 75, using a high-level Deep-ON/OFF signal and an ON pulse PS1. Thus, a device for detecting whether the power cord 75 is connected (e.g., a zero-cross signal generating circuit) may be unnecessary. Accordingly, circuit configuration may be facilitated and manufacturing costs may be reduced.

In S15, when the detection signal SK is at low-level (S15: NO), the MCU 71 transmits an ON pulse PS1 to the tower tray low-voltage power supply 72 (S27). At this time, as depicted in FIG. 5, as the MCU 71 is transmitting a high-level Deep-ON/OFF signal, a state will shift from the state ST4 to the state ST6, and an option drive voltage of the tower tray low-voltage power supply 72 will increase from 0 V to 24 V. The MCU 71 transmits an ON pulse PS1 while maintaining the Deep-ON/OFF signal at high-level. Thereafter, the MCU 71 determines whether a detection signal SK is at high-level (S29).

When the detection signal SK is at high-level (S29: YES), the MCU 71 determines an immediately preceding mode of the tower tray low-voltage power supply 72 as the first low output mode, in other words, the tower tray low-voltage power supply 72 was placed in the state ST4 (S31). Thus, the MCU 71 may determine the first low output mode and the second low output mode. As the MCU 71 detects that the tower tray low-voltage power supply 72 was in the first low output mode (S31), the MCU 71 performs a process (S33), to reduce the Deep-ON/OFF signal to low-level and transmit an OFF pulse PS2 to place the state of the tower tray low-voltage power supply 72 back.

The MCU 71 determines a signal level of the detection signal SK (S23). When a low-level detection signal SK is input (S23: YES), the MCU 71 transmits a complete command SC representing that the tower tray low-voltage power supply 72 has been shifted to the first low output mode, to the ASIC 51 (S25).

In S29, when the detection signal SK is at low-level (S29: NO), the MCU 71 determines that the power cord 75 is not connected to the AC power supply AC (S35). The MCU 71 transmits error information ER (refer to FIG. 2) representing that the power cord 75 is not connected, to the ASIC 51 via the communication line CL1 (S37). As the ASIC 51 receives the error information ER, an error is displayed, for example, in the display unit 4 to notify a user that the power cord 75 is not connected. Thus, the MCU 71 may determine connection or disconnection of the power cord 75, in addition to mode determination.

In the illustrative embodiment, following effects may be achieved.

<Effect 1> The main low-voltage power supply 20 of the printer 1 is configured to supply power to the ASIC 51 of the controller 50 of the printer 1. The main low-voltage power supply 20 is also configured to supply a control voltage of 3.3 V to the MCU 71 of the tower tray 70, via the power supply line SL1. Thus, the MCU 71 may be operated when the ASIC 51 is activated (e.g., in the print mode, the ready mode, the sleep mode, and the deep sleep mode). Thus, power-saving may be achieved.

The tower tray 70 according to the illustrative embodiment includes the comparator 77 for determining a level of an option drive voltage output from the tower tray low-voltage power supply 72. The comparator 77 is configured to compare an option drive voltage with a reference voltage and transmit a comparison result to the MCU 71 as a detection signal SK. Thus, the MCU 71 may determine an operation status of the tower tray low-voltage power supply 72 (e.g., a mode and connection or disconnection of the power cord 75), based on a detection signal SK.

<Effect 2> The comparator 77 is configured to output a high-level detection signal SK to the MCU 71 when an option drive voltage (e.g., 24 V) is greater than or equal to a reference voltage. The comparator 77 is configured to output a low-level detection signal SK to the MCU 71 when an option drive voltage (e.g., 6 V or 0 V) is less than a reference voltage. Therefore, the MCU 71 may determine whether the tower tray low-voltage power supply 72 is in the normal mode or the low output mode (including the first low output mode and the second low output mode) based on a detection signal SK.

<Effect 3> When the tower tray low-voltage power supply 72 receives an ON pulse PS1 and a high-level Deep-ON/OFF signal from the MCU 71 in a state in which the tower tray low-voltage power supply 72 is placed in the state ST4, e.g., the first low output mode, the tower tray low-voltage power supply 72 is placed in the normal mode (e.g., the state ST6). When the power cord 75 is not connected to the AC power supply AC, an option drive voltage of the tower tray low-voltage power supply 72 remains 0 V even with an input of an ON pulse PS1 and a high-level Deep-ON/OFF signal. The MCU 71 may determine whether the power cord 75 is connected, by transmitting an ON pulse PS1 and a high-level Deep-ON/OFF signal.

<Effect 4> When the MCU 71 places the tower tray low-voltage power supply 72 from the second low output mode to the normal mode (e.g., from the state ST3 to the state ST6) by executing S13, the MCU 71 performs processing, e.g., reducing a Deep-ON/OFF signal (S19 and S21), to return a state of the tower tray low-voltage power supply 72 after mode determination (S17). Thus, the MCU 71 may confirm that the power cord 75 is properly connected and the tower tray low-voltage power supply 72 is placed in the second low output mode, and power-saving may be achieved.

<Effect 5> The MCU 71 transmits an ON pulse PS1 to the tower tray low-voltage power supply 72 (S27). Thereafter, as a detection signal SK is at low-level (S29: NO), the MCU 71 determines that the power cord 75 is not connected to the AC power supply AC (S35). The MCU 71 transmits error information ER representing that the power cord 75 is not connected, to the ASIC 51 via the communication line CL1 (S37). Thus, the ASIC 51 may execute a process for displaying an error in the display unit 4 to notify a user that the power cord 75 is not connected.

<Effect 6> In the state ST4 as depicted in FIG. 5, as the tower tray low-voltage power supply 72 receives an ON pulse PS1 (refer to FIG. 4) from the MCU 71, the tower tray low-voltage power supply 72 is placed from the first low output mode back to the second low output mode (e.g., from the state ST4 to the state ST3). As the tower tray low-voltage power supply 72 receives an OFF pulse PS2 in the state ST3, the tower tray low-voltage power supply 72 is placed from the second low output mode to the first low output mode (e.g., from the state ST3 to the state ST4). In the illustrative embodiment, the pulse width of an ON pulse PS1 is shorter than that of an OFF pulse PS2. Therefore, the MCU 71 may determine an ON pulse PS1 and an OFF pulse PS2 by detecting a leading edge and falling edge of, for example, an ON pulse PS1.

<Effect 7> In the printer system 100, the MCU 71 and the tower tray low-voltage power supply 72 are connected to each other by the signal line CL5. In the state ST6, as the tower tray low-voltage power supply 72 receives a Deep-ON/OFF signal of the ground voltage Vgd (e.g., low-level) from the MCU 71 via the signal line CL5, the tower tray low-voltage power supply 72 is placed in the state ST3, e.g., the second low output mode. In the state ST3, as the tower tray low-voltage power supply 72 receives a high-level Deep-ON/OFF signal from the MCU 71, the tower tray low-voltage power supply 72 is placed in the state ST6, e.g., the normal mode. The signal line CL5 is connected to a ground via the pull-down resistor RD. The ground voltage Vgd is supplied to the signal line CL5. Therefore, when a high-level Deep-ON/OFF signal is not transmitted from the MCU 71, the potential of the signal line CL5 is placed in the ground potential (e.g., 0 V). As the potential of the signal line CL5 becomes the ground potential, the tower tray low-voltage power supply 72 is placed in a state that the tower tray low-voltage power supply 72 is receiving a low-level Deep-ON/OFF signal, and an option drive voltage becomes 6 V. Thus, for example, as the dedicated power cord 7A is removed or pulled off from the connecting portion 74 in the normal mode in which the tower tray low-voltage power supply 72 outputs 24 V, the printer 1 stops and the MCU 71 that receives power supply from the main low-voltage power supply 20 of the printer 1 stops. In this case, as the potential of the signal line CL5 is placed in the ground potential, an option drive voltage output from the tower tray low-voltage power supply 72 may be reduced and power-saving may be achieved.

<Effect 8> In the state ST4 as depicted in FIG. 5, as a high-level Deep-ON/OFF signal is transmitted from the MCU 71 to the tower tray low-voltage power supply 72 without a tower tray low-voltage power supply signal TTS-ON/OFF transmitted, the tower tray low-voltage power supply 72 maintains the first low output mode (e.g., the state ST4). Therefore, as the MCU 71 transmits, after activated, for example, a high-level Deep-ON/OFF signal, to the tower tray low-voltage power supply 72 (S13), and receives a high-level detection signal SK from the comparator 77 (S15: YES), the MCU 71 may determine that an immediately preceding mode of the tower tray low-voltage power supply 72 is the second low output mode (S17). In other words, the MCU 71 may determine the first low output mode and the second low output mode with the use of a Deep-ON/OFF signal and a detection signal SK of the comparator 77.

While the disclosure has been described in detail referring to the specific embodiment thereof, this is merely an example, and various changes, arrangements and modifications may be applied therein without departing from the spirit and scope of the disclosure.

Figure 7:
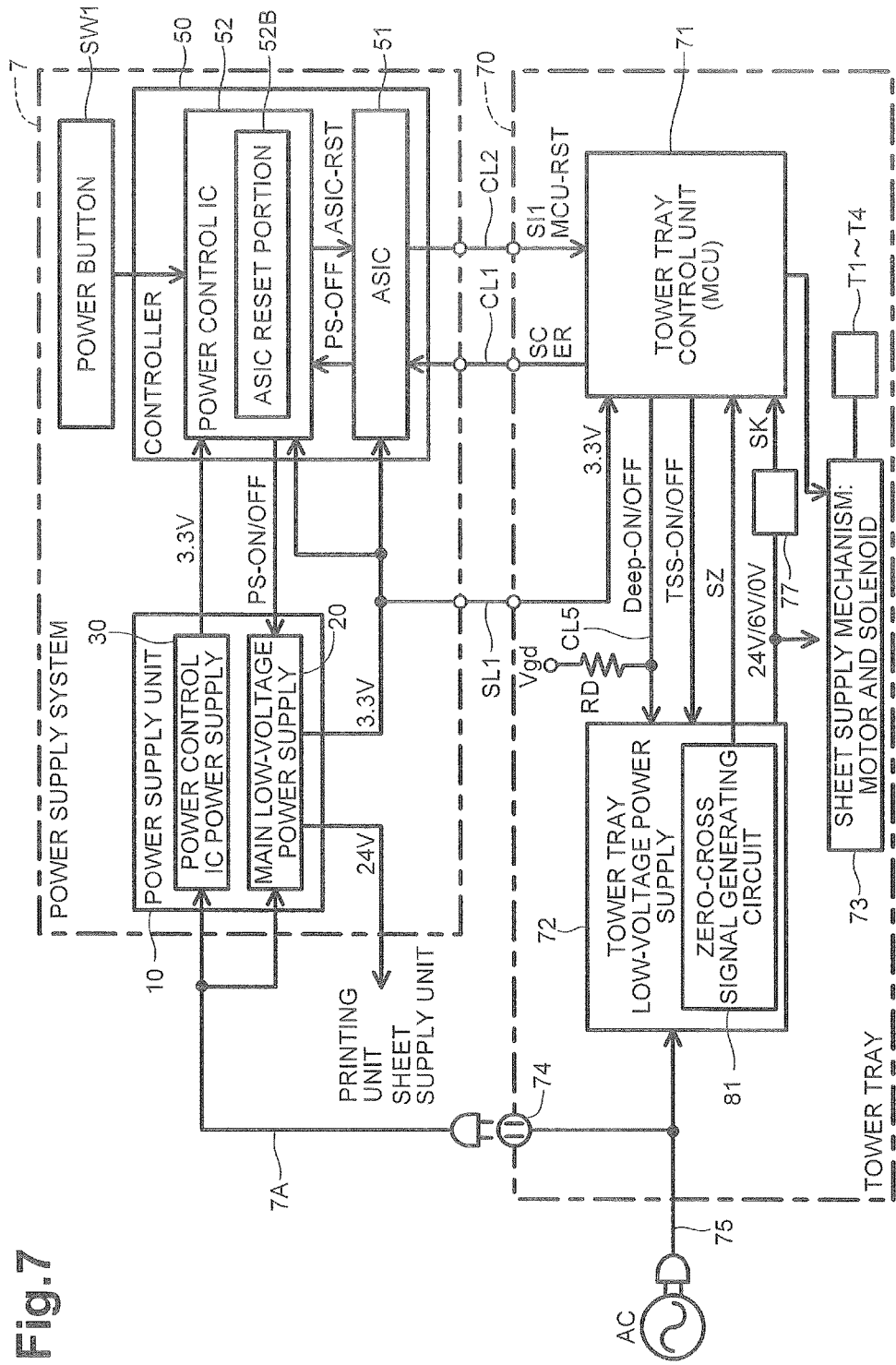
FIG. 7 is a block diagram illustrating power supply configuration of a printer system according to another illustrative embodiment.

For example, in another embodiment, the tower tray low-voltage power supply 72 may include a zero-cross signal generating circuit 81 for generating a zero-cross signal SZ in synch with a zero-cross timing of the AC power supply AC, as depicted in FIG. 7. For example, the zero-cross signal generating circuit 81 may be configured to supply a pulse signal corresponding to a zero-cross timing of AC voltage supplied from the AC power supply AC, to the MCU 71 as a zero-cross signal SZ. When the power cord 75 is not connected to the AC power supply AC, a zero-cross signal SZ is not generated. Therefore, the MCU 71 may determine whether the power cord 75 is connected, based on a zero-cross signal SZ.

The tower tray 70 may include a plurality of comparators 77. For example, the tower tray 70 may include a comparator 77 with a setting of a reference voltage between 6 V and 0 V. Thus, the MCU 71 may determine the first low output mode (e.g., 0 V) and the second low output mode (e.g., 6 V), based on a detection signal SK of the comparator 77.

The tower tray low-voltage power supply 72 may not have to have the low output mode. For example, the tower tray low-voltage power supply 72 may be configured to generate an option drive voltage of 24 V only. In this case, the MCU 71 may be configured to determine connection or disconnection of the power cord 75, based on a detection signal SK of the comparator 77. The signal line CL5 for Deep-ON/OFF signal transmission may be omitted.

Figure 6:
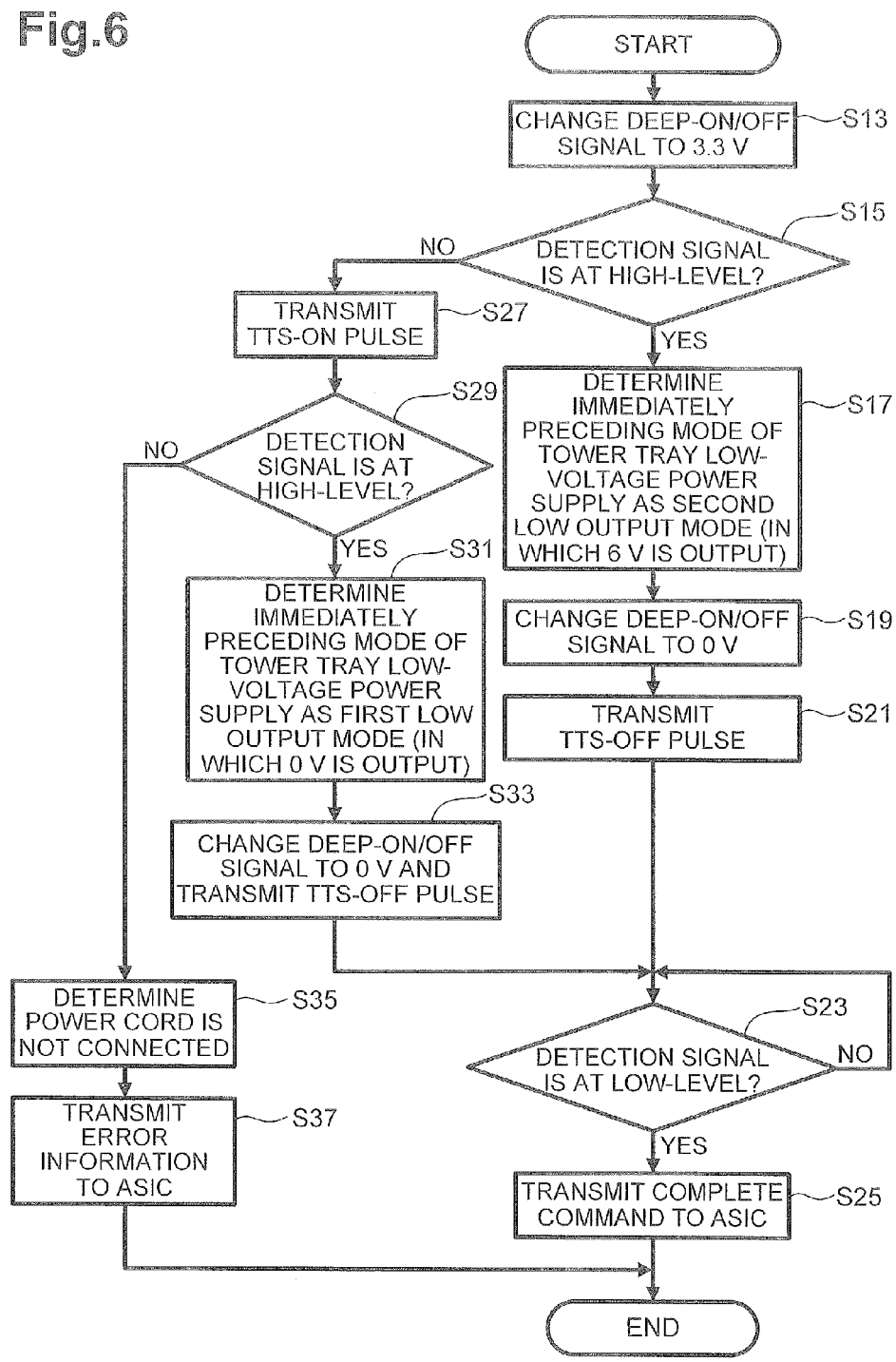
FIG. 6 is a flowchart illustrating determination processing at a startup of the MCU according to the illustrative embodiment.

The MCU 71 may not have to execute the processes in S19 and S21 depicted in FIG. 6, e.g., processing to reduce a Deep-ON/OFF signal. For example, the MCU 71 may be configured to transmit a complete command SC representing that the tower tray low-voltage power supply 72 is activated with 24 V, to the ASIC 51 (S25), after the MCU 71 finishes determination of a mode of the tower tray low-voltage power supply 72 (S17). Then, the processing may end.

The MCU 71 may be configured to execute the process in S19 as depicted in FIG. 6 but not to execute the process in S21. For example, the MCU 71 may be configured to transmit a complete command SC representing that the tower tray low-voltage power supply 72 is activated with 6 V, to the ASIC 51 (S25) after the MCU 71 finishes determination of a mode of the tower tray low-voltage power supply 72 (S17). Then, the processing may end.

In the above-described illustrative embodiment, when the printer 1 is in the deep sleep mode, the tower tray low-voltage power supply 72 is placed in the first low output mode in which generation of an option drive voltage is stopped. Alternatively, when the printer 1 is in the deep sleep mode, the tower tray low-voltage power supply 72 may be placed in the second low output mode in which an option drive voltage of 6 V is output.

The MCU 71 may be configured not to transmit error information ER representing the power cord 75 is not connected, to the ASIC 51 (S37).

The tower tray 70 may not have to include the pull-down resistor RD connected to the signal line CL5.

Figure 4:
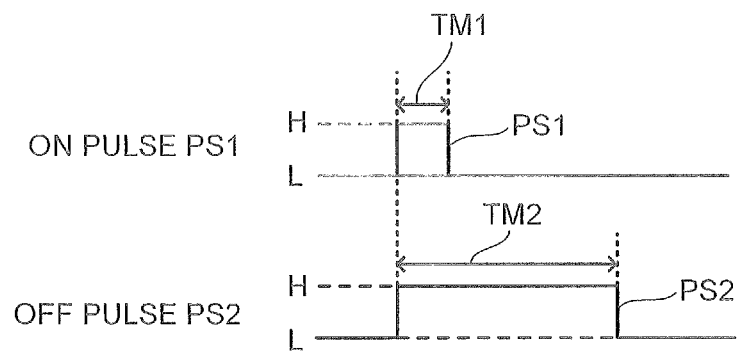
FIG. 4 is a diagram illustrating a tower tray low-voltage power supply signal used by a MCU to control a tower tray low-voltage power supply according to the illustrative embodiment.

The pulse width of an ON pulse PS1 may be longer than or the same as that of an OFF pulse PS2, unlike the pulse width as depicted in FIG. 4.

In an image forming system according to the disclosure, a power supply of an image forming apparatus may be configured to supply a control voltage to an option device via a power supply line. In other words, an option controller of the option device may be configured to operate with power supply from the image forming apparatus. Thus, the option controller may be operated when an apparatus controller of the image forming apparatus is activated. A known option controller may need to be activated at all times to receive a control signal from an apparatus controller. This may cause increase in power consumption. The image forming system according to the disclosure may achieve power-saving because the option controller may be configured to operate in association with startup, e.g., activation, and stop of the apparatus controller.

In a known image forming system, for example, a control voltage for an option controller may be supplied from an option power supply. The option controller may be configured to be activated when a power cord of an option device is connected to a commercial power supply. In other words, when the option power supply is activated, the option controller may be activated. In this case, the option controller may determine that option power supply is activated, in other words, the power cord of the option device is connected to a commercial power supply, by the activation of the option controller itself. In a configuration in which a control voltage of an option controller is supplied from a power supply of an image forming apparatus as in the image forming system according to the disclosure, the option controller may be activated, for example, as a power cord of the image forming apparatus is connected to a commercial power supply, regardless of whether a power cord of the option device is connected or disconnected. Consequently, the option controller will not be able to determine whether the power cord of the option device is connected by an activation of the option controller. Therefore, in such configuration that a control voltage is supplied from the power supply of the image forming apparatus to the option controller, a state of the option power supply may need to be determined, for example, at startup or activation of the option controller.

In the image forming system according to the disclosure, a detector may be configured to transmit different detection signals according to operation statuses of the option power supply. Operation statuses of the option power supply may include, for example, connection or disconnection of the power cord of the option device, in other words, input or no input from a commercial power supply to the option power supply. An option power supply may be configured to change a voltage value of an option drive voltage that is supplied to a drive load according to modes for power-saving. In this case, the detector may be configured to transmit different detection signals according to respective modes (e.g., operation statuses). The option controller may determine an operation status of the option power supply based on a detection signal received from the detector. Thus, even in a configuration in which a control voltage is supplied from the image forming apparatus (from its power supply) to the option controller, the option controller may determine, for example, at the time of its startup or activation, an operation status of the option power supply and connection or disconnection of the power cord.

In the image forming system according to the disclosure, the option controller may determine whether an option drive voltage is greater than or equal to a reference voltage, based on first and second detection signals from the detecting circuit. For example, the option controller may determine that an output of the option power supply is low based on the second detection signal received from the detector. In other words, the option controller may determine a state of the option power supply based on the first and second detection signals received from the detector.

The option controller may determine whether an option drive voltage is greater than or equal to a reference voltage based on the first and second detection signals received from the detector. However, for example, when the option power supply has a low output mode in which option drive voltage is 0 V (e.g., a first low output mode), the option controller will not be able to determine whether an option drive voltage is 0 V because of the low output mode, or an option drive voltage is not generated because of disconnection of the power cord. In the image forming system according to the disclosure, for example, as the option power supply shifts to the normal mode in response to a release signal from the option controller, an option drive voltage may become greater than or equal to the reference voltage. The detector may transmit a first detection signal to the option controller. Therefore, the option controller may detect a change in signals received from the detector from the second detection signal to the first detection signal, so that the option controller may detect that the option power supply has shifted from the low output mode to the normal mode. In this case, power may be supplied to the option device via the power cord, and the option power supply may be operated in respective modes.

When the option power supply is stopped, for example, with no power supply from an external power supply, the option power supply may not respond to a release signal from the option controller. The detector may maintain the second signal. Therefore, the option controller may detect that power is not supplied to the option power supply, in other words, the power cord is not connected, because a signal that the option controller receives may be maintained to the second signal.

For example, a zero cross circuit may be provided to the option power supply. A signal output from the zero cross circuit may be transmitted to the option controller, so that the option controller may determine whether the power cord is connected. In an image forming system of this type, a zero cross circuit may be generally used to control a heater for thermally fixing an image formed onto a sheet by an image forming unit. However, chances may be low that an option device, which is configured or intended to supply sheets and does not have an image forming function, includes a device (e.g., a heater) that requires controls by a zero cross circuit. Therefore, if a zero cross circuit is provided to the option power supply only for the detection of connection or disconnection of the power cord, an internal structure of the option power supply may become complicated, which may be undesirable. The image forming system according to the disclosure may detect a low output mode and disconnection of the power cord, without providing a zero cross circuit to the option device. Accordingly, structures of the option power supply may be facilitated.

As the option controller detects that a first detection signal is received in response to a transmitted release signal, in other words, the power cord is connected and power is supplied to the option power supply from an external power supply, the option controller may place the option power supply in a low output mode again. Thus, the option controller may achieve power-saving after confirming that the power cord is connected.

The apparatus controller may notify a user of, for example, disconnection of the power cord of the option device, in response to notification from the option controller. More specifically, the apparatus controller may provide notification by displaying on a control panel, turning a corresponding lamp or light on, or informing to an external management computer (PC) via a network. When the apparatus controller detects disconnection of the power cord of the option device, for example, at a time when a sheet is supplied for printing from the option device, e.g., a sheet supply device, a replacement sheet may be supplied from a sheet supply tray of the image forming apparatus for printing. In other words, the apparatus controller may execute not only notification to a user but processing to avoid troubles attributable to disconnection of the power cord.

As the option power supply shifts to the first low output mode, generation of an option drive voltage may stop. Thus, power-saving may be achieved. Pulse signals, each having a different pulse width, may be used as a first low output mode shift signal and a first low output mode release signal. For example, the option controller may determine the first low output mode shift signal and the first low output mode release signal by detecting a leading edge and falling edge of a pulse signal.

As the option power supply receives a second low output mode shift signal of a ground voltage from the option controller via a signal line, the option power supply may shift to a second low output mode in which an option drive voltage is reduced as compared with an option drive voltage in the normal mode. The option power supply may shift to the normal mode as the option power supply receives a second low output mode release signal whose voltage value is greater than that of the second low output mode shift signal. In such configuration, when the option controller is stopped for some reasons in a state in which the option power supply is in the normal mode, the option power supply may not shift to the second low output mode. Accordingly, power-saving may not be achieved. The option controller may stop as supply of a control voltage from a power supply of the image forming apparatus to the option controller is stopped. The option controller may stop, for example, when a power cord of the image forming apparatus is pulled off, or the image forming apparatus and the option device are not properly connected, or after the apparatus controller executes an initial setting immediately after the power cord is plugged in. In the option device according to the disclosure, the signal line connecting the option controller and the option power supply may be connected to a ground via a pull-down resistor. Therefore, when the option controller stops and a second low output mode shift signal or a second low output mode release signal is not output, a voltage value of the signal line may be a ground voltage. Accordingly, the ground voltage may be input to the option power supply via the signal line, in other words, a second low output mode shift signal may be input to the option power supply, so that the option power supply may shift to the second low output mode. Therefore, even when the option controller is stopped for some reason, power-saving may be achieved by reducing a voltage value of an option drive voltage output from the option power supply.

The option power supply may have two power-saving modes, e.g., the first low output mode and the second low output mode. In this case, when the option controller receives a second detection signal from the detector, the option controller may need to determine whether the option power supply is placed in the first low output mode or the second low output mode. The option power supply according to the disclosure may maintain the first low output mode even when the option controller transmits a second low output mode release signal while the option power supply is placed in the first low output mode. For example, after the option controller transmits a second low output mode release signal in a state in which the option controller receives a second detection signal, the option controller may still receive a second detection signal from the detector. In this case, the option controller may determine that the option power supply is placed in the first low output mode. When the option controller receives a first detection signal from the detector after the option controller transmits a second low output mode release signal, the option controller may determine that the option power supply was placed in the second low output mode. In other words, the option controller may determine the first low output mode and the second low output mode, using a second low output mode release signal and first and second detection signals from the detector.

In the image forming system according to the disclosure, for example, the option controller may determine whether the option power supply is connected to an external power supply by determining the presence or absence of a pulse of a zero-cross signal received from a zero-cross signal generating circuit.

What is claimed is:

1. An image forming system, comprising:
   an image forming apparatus;
   an option device; and
   a power supply line configured to connect the image forming apparatus and the option device;
   wherein the image forming apparatus includes:
      an apparatus controller configured to control the image forming apparatus;
      an image forming unit; and
      an apparatus power supply configured to generate a control voltage that is supplied to the apparatus controller and an apparatus drive voltage that is supplied to the image forming unit; and
   wherein the option device includes:
      a drive load;
      an option power supply configured to generate an option drive voltage that is supplied to the drive load;
      an option controller configured to control the option power supply and receive the control voltage supplied from the apparatus power supply, via the power supply line; and
      a detector configured to transmit a detection signal to the option controller, the detection signal from among a plurality of different detection signals corresponding to operation statuses of the option power supply;
   wherein the detector is configured to transmit a first detection signal to the option controller when the option drive voltage is greater than or equal to a reference voltage and transmit a second detection signal to the option controller when the option drive voltage is less than the reference voltage;
   wherein the option power supply includes a normal mode in which the option power supply generates the option drive voltage that is greater than or equal to the reference voltage and a low output mode in which the option power supply generates the option drive voltage that is less than the reference voltage; and
   wherein the option controller is configured to transmit a release signal for releasing the low output mode to the option power supply in response to receiving the second detection signal from the detector.

2. The image forming system according to claim 1, wherein the option controller is configured to transmit a shift signal for shifting the option power supply to the low output mode to the option power supply in response to receiving the first detection signal from the detector after the option controller transmits the release signal to the option power supply.

3. The image forming system according to claim 1, wherein the option controller is configured to notify the apparatus controller of information representing that the power cord of the option device is not connected to an external power supply in response to receiving the second detection signal from the detector after the option controller transmits the release signal to the option power supply.

4. The image forming system according to claim 2, wherein the option power supply includes a first low output mode in which the option power supply stops generating the option drive voltage, as the low output mode;
   the option power supply is configured to shift to the first low output mode in response to receiving a first low output mode shift signal that is a pulse signal from the option controller; and
   the option power supply is configured to release the first low output mode in response to receiving a first low output mode release signal that is a pulse signal of which pulse width is different from that of the first low output mode shift signal from option controller.

5. The image forming system according to claim 4, wherein the option device includes a signal line configured to connect the option controller and the option power supply and a pull-down resistor configured to connect the signal line to a ground supplying a ground voltage;
   the option power supply includes a second low output mode in which the option power supply generates the option drive voltage higher than that in the first low output mode and lower than that in the normal mode, as the low output mode;
   the option power supply is configured to:
   shift to the second low output mode in response to receiving a second low output mode shift signal having a voltage value same as the ground voltage from the option controller via the signal line; and
   shift to the normal mode in response to receiving a second low output mode release signal having a voltage value higher than the ground voltage from the option controller via the signal line.

6. The image forming system according to claim 5, wherein the option power supply is configured to maintain the first low output mode even when the option power supply receives the second low output mode release signal during the first low output mode.

7. The image forming system according to claim 1, wherein the detector is configured to be a zero-cross signal generating circuit configured to generate a zero-cross signal in synch with a zero-cross timing of AC voltage supplied to the option power supply from an external power supply.

8. The image forming system according to claim 1, wherein the apparatus controller is configured to:
   receive operation status information, the operation status information including error information; and
   generate a notification of an error at the apparatus controller based on the received error information.

9. A system comprising:
   an option device including:
      a drive load;
      an option power supply configured to generate an option drive voltage that is supplied to the drive load;
      an option controller configured to control the option power supply and receive a control voltage supplied via an external power supply line, the external power supply line being separate from the option power supply; and
      a detector configured to transmit a detection signal to the option controller, the detection signal from among a plurality of different detection signals corresponding to operation statuses of the option power supply;

wherein the detector is configured to transmit a first detection signal to the option controller when the option drive voltage is greater than or equal to a reference voltage and transmit a second detection signal to the option controller when the option drive voltage is less than the reference voltage;

wherein the option power supply includes a normal mode in which the option power supply generates the option drive voltage that is greater than or equal to the reference voltage and a low output mode in which the option power supply generates the option drive voltage that is less than the reference voltage; and wherein the option controller is configured to transmit a release signal for releasing the low output mode to the option power supply in response to receiving the second detection signal from the detector.

10. The system of claim 9, further comprising an image forming apparatus.

11. The system of claim 10, wherein the image forming apparatus further includes
a power supply line electrically connected to an apparatus power supply, the power supply line configured to connect to the external power supply line of the option device.

12. The system of claim 9, wherein the option device comprises a housing, wherein the drive load, the option power supply, the option controller, and the detector are located within the housing.

13. An image forming system, comprising:
an image forming apparatus, comprising:
an image forming unit;
a housing configured to store the image forming unit;
an apparatus controller disposed inside the housing and configured to control the image forming unit;
an apparatus power supply disposed inside the housing and configured to generate a control voltage that is supplied to the apparatus controller and an apparatus drive voltage that is supplied to the image forming unit, the apparatus power supply including an output terminal from which the control voltage is outputted;
a first connection terminal exposed external to the housing and electrically connected to the output terminal of the apparatus power supply; and
a second connection terminal exposed external to the housing and electrically connected to the apparatus controller,
wherein the apparatus controller is configured to:
receive operation status information via the second connection terminal, the operation status information including error information; and
generate a notification of an error at the apparatus controller based on the received error information.

14. The image forming system of claim 13, wherein the error information includes information identifying a power error, and wherein the notification comprises a notification of the power error.

15. The image forming system of claim 14, wherein the power error includes a power interruption at an option power supply of an option device.

16. The image forming system of claim 14, wherein the apparatus controller is further configured to transmit the notification to a display, causing the display to present a message to the user regarding the power error.

17. The image forming system of claim 13, wherein the apparatus controller is configured to transmit a message via the second connection terminal.

18. The image forming system of claim 17, wherein the apparatus controller is configured to transmit the message to an option controller of an option device communicatively connected to the second connection terminal of the image forming apparatus.

* * * * *